(12) United States Patent
Caldera et al.

(10) Patent No.: US 7,019,953 B2
(45) Date of Patent: Mar. 28, 2006

(54) VOLTAGE PROTECTION CIRCUIT

(75) Inventors: Peter Caldera, Villach (AT); Axel Schmitt, Munich (DE)

(73) Assignee: Infineon Technologies, AG, Munich (DE)

( * ) Notice: Subject to any disclaimer, the term of this patent is extended or adjusted under 35 U.S.C. 154(b) by 144 days.

(21) Appl. No.: 10/440,741

(22) Filed: May 19, 2003

(65) Prior Publication Data

US 2004/0233691 A1    Nov. 25, 2004

(51) Int. Cl.
*H02H 9/00*    (2006.01)
(52) U.S. Cl. ....................................................... 361/56
(58) Field of Classification Search ................ 361/56, 361/111, 113, 118, 58
See application file for complete search history.

(56) References Cited

U.S. PATENT DOCUMENTS 5,003,588 A * 3/1991 Wingerath .................. 379/412
5,274,524 A * 12/1993 Pezzani et al. ............... 361/56
6,718,020 B1 * 4/2004 Caldera et al. ............ 379/93.14

* cited by examiner

*Primary Examiner*—Stephen W. Jackson
(74) *Attorney, Agent, or Firm*—Holme Roberts & Owen LLP

(57) ABSTRACT

A voltage protection circuit for a terminal of an electronic device, for example the TIP and RING lines of a linecard, is provided. The voltage protection circuit comprises a protection element, a first terminal of which is coupled to the terminal of the electronic device, a second terminal of which is coupled to a ground potential and a control terminal of which is coupled to a reference voltage element, the protection element having a low resistance between its first and second terminals when the control terminal is in a first state and a higher resistance between its first and second terminals when the control terminal is in a second state, the reference voltage element being further coupled to a reference voltage and being adapted such that the state of the control terminal depends on an applied voltage at the first terminal and the reference voltage. Additionally, a voltage limiting element for limiting the voltage drop over the reference voltage element coupled to the reference voltage and the ground potential is provided, leading to less severe demands on the reference voltage element. Additionally or alternatively, a voltage limiting element between the protection element and the reference voltage element may be provided.

18 Claims, 3 Drawing Sheets

VOLTAGE PROTECTION CIRCUIT

CROSS-REFERENCE TO RELATED APPLICATIONS

Not applicable.

BACKGROUND OF THE INVENTION

1. The Field of the Invention

The present invention relates to a voltage protection circuit for a terminal of an electronic device. More particularly, the invention relates to a voltage protection circuit for a terminal of a linecard or any other communication apparatus.

2. The Relevant Technology

According to international norms, a linecard in a telecommunication system has to be protected against accidental application of a voltage, for example through a stroke of lightning or contact with a system voltage.

In FIG. 4, an example of a suitable voltage protection circuit is shown. A terminal line 1 of a linecard, for example the so-called TIP line of the linecard, is protected by an n-controlled thyristor 3. The anode side gate of the thyristor is biased with a positive voltage Vp, for example a positive battery voltage. One terminal of the thyristor 3 is coupled with the line 1 to be protected, another terminal is connected with mass or another suitable potential ("protective count"). If a positive voltage exceeding the gate voltage Vp is applied to line 1, the thyristor ignites, and the voltage applied on line 1 is deviated to mass. Thus, the linecard is protected from the high voltage.

For very short voltage pulses shorter than the gate turn on time of the thyristor, a capacitor (not shown) may be additionally provided to deviate these very short voltage pulses.

An extension of this concept to two lines to be protected (for example, the TIP and RING lines of a linecard) against both positive and negative voltages is shown in FIG. 5. The lines 1 and 2, for example the TIP and RING lines of a linecard, are both protected by two thyristors. Namely, each line is protected by an n-controlled thyristor 3 and with a positive gate voltage Vp for protection against positive voltages, as already discussed above. Additionally, a P-controlled thyristor 4 is provided for each of the lines 1 and 2. The cathode side gates of thyristors 4 are biased by a negative voltage Vn, for example a negative battery voltage. Similar to the thyristors 3, the thyristors 4 ignite if a negative voltage with an absolute magnitude exceeding the one of Vn is applied to the respective line 1 or 2. Thus, the linecard is also protected against a negative overvoltage.

In the following, as an example, only the protection against positive overvoltage by an n-controlled thyristor will be discussed. The concepts presented are likewise applicable to the case of negative overvoltage protection.

If a positive voltage exceeding Vp is applied to line 1 in FIG. 4 (or FIG. 5), a control current flows from the gate terminal of thyristor 3 to the voltage source providing Vp, for example a battery. However, on many linecards, the battery voltages are provided by a DC-DC converter. Such a DC-DC converter, because of its architecture, cannot accept a current. Thus, the above described control current cannot flow, and the potential applied at the gate of the thyristor increases along with a possible voltage increase at line 1, and consequently the thyristor does not ignite. In this case, the linecard is not protected against overvoltage.

Accordingly, additional elements have to be provided to deviate this current to mass. An example therefore is shown in FIG. 6, where a Darlington circuit with a bipolar transistor 5 is provided to meet that end. The transistor 5 has to be adapted such that it is in an on state when the voltage on line 1 exceeds the positive voltage Vp. Thus, a control current flowing from the gate terminal of thyristor 3 is deviated to mass.

With such an arrangement, two problems may occur. On the one hand, if the voltage Vp is high, for example 100 V, it is difficult to provide suitable transistors 5 as the maximum power dissipation or the maximum collector voltage is easily exceeded. On the other hand, the linecard may be part of a communication system where two signals are transmitted via the lines. An example for such a system is a combined standard telephone system (Plain Old Telephone System, POTS) and ADSL system (Asymmetric Digital Subscriber Line). When a call comes in, the voltage on the so-called TIP/RING lines exceeds the battery voltage as the voltage of a ring signal adds with the voltage of the ADSL signal. In the circuit shown in FIG. 6, in this case, the thyristor would ignite and limit the ADSL signal.

BRIEF SUMMARY OF THE INVENTION

It is thus an object of the present invention to provide a voltage protection circuit where the demands on a reference voltage element like the transistor 5 shown in FIG. 6 are less severe even if a high battery voltage is used.

It is a further object of the present invention to provide a voltage protection circuit adapted to reliably protect a line where signals exceeding an applied reference voltage are transmitted.

Accordingly, the present invention provides a voltage protection circuit for a terminal of an electronic device, comprising a protection element, a first terminal of which is coupled to the terminal of the electronic device, a second terminal of which is coupled to a ground potential and a control terminal of which is coupled to a reference voltage element, the protection element having a low resistance between its first and second terminals when the control terminal is in a first state and a high resistance between its first and second terminals when the control terminal is in a second state, the reference voltage element being further coupled to a reference voltage and being adapted such that the state of the control terminal depends on a voltage applied at the first terminal and the reference voltage, and a voltage limiting element for limiting the voltage drop over the reference voltage element coupled to the reference voltage and the ground potential.

Through the use of the voltage limiting element the voltage drop over the reference voltage element is reduced. Thus, even when the reference voltage is very high, the choice of possible reference voltage element is less restricted than in the case without the voltage limiting element. Advantageously, the protection element may be adapted such that its control terminal is in the first state if the absolute value of the applied voltage is greater than the absolute value of the reference voltage and in the second state otherwise. Alternatively, the control terminal may be in the first state only when the sign of the applied voltage is the same as the sign of the reference voltage and the absolute value of the applied voltage is greater than the absolute value of the reference voltage.

A thyristor may be used as the protection element, a transistor may be used as the reference voltage element and a zener diode may be used as the voltage limiting element. The reference voltage may be a battery voltage.

The voltage protection circuit may further comprise a capacitor coupled between the reference voltage and the ground potential. This capacitor serves to deviate very short voltage pauses shorter than a gate turn on time of the thyristor.

The present invention further provides a voltage protection circuit for a terminal of an electronic device comprising a protection element, a first terminal of which is coupled to the terminal of the electronic device, a second terminal of which is coupled to a ground potential and a control terminal of which is coupled to a reference voltage element, the protection element having a low resistance between its first and second terminals when the control terminal is in a first state and a high resistance between its first and second terminals when the control terminal is in a second state, the reference voltage element being further coupled to a reference voltage and being adapted such that the state of the control terminal depends on a voltage applied at the first terminal and the reference voltage, and a voltage limiting element coupled between the protection element and the reference voltage element, the voltage limiting element being adapted such that a minimum value of the applied voltage at the first terminal necessary for the control terminal to be in the first state is greater than without the voltage limiting element. Such a voltage protection circuit may serve to protect communication lines where more than one signal is transmitted simultaneously. Through the use of the voltage limiting element, a higher voltage than the sum of the voltages of the transmitted signals is necessary to activate the protection element, that is to bring the control terminal into the first state.

The voltage limiting element here may be also a zener diode. The protection element may be a thyristor, and the reference voltage element may be a transistor.

The two above described voltage protection circuits may be extended or combined to a circuit comprising two voltage limiting elements, one for limiting the voltage drop over the reference voltage element and one for enabling the circuit to be used for a transmission line where more than one signal is transmitted.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Preferred embodiments of the present invention will now be described, by way of example only, with reference to the accompanying drawings, in which.

DETAILED DESCRIPTION OF THE PREFERRED EMBODIMENTS

Figure 1:
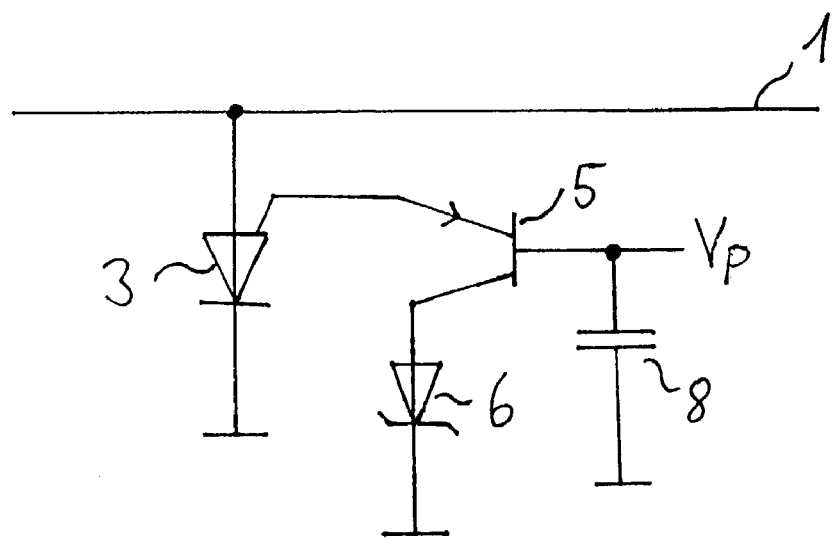
FIG. 1 shows a first embodiment of a voltage protection circuit according to the present invention.

In FIG. 1 a first embodiment according to the present invention is shown.

A line 1 leading to a terminal of an electronic device (not shown) to be protected, for example the TIP line of a linecard, is connected to a terminal of a thyristor 3. Another terminal of thyristor 3 is connected to mass. In the embodiment shown, the thyristor 3 is an n-controlled thyristor. The anode side gate of the thyristor 3 is connected to the emitter of a bipolar npn-transistor 5. The base of transistor 5 is connected to a positive reference voltage Vp, for example a battery voltage, and to mass via a capacitor 8. The collector of transistor 5 is connected to mass via a zener diode 6.

Through the transistor 5, the positive reference voltage Vp acts on the anode side gate of thyristor 3. Thus, if a positive voltage exceeding Vp is applied at line 1, for example through accidental contact with the system voltage or through a lightning stroke, a current flows from thyristor 3 to transistor 5 and is deviated to mass via the zener diode 6. Through this current, which is a control current for thyristor 3, thyristor 3 ignites, and the voltage applied to line 1 is deviated to mass.

Since the zener diode 6 is connected between the collector of transistor 5 and mass, only a part of the voltage applied at line 1 is present as an emitter-collector voltage of transistor 5, the remainder of the voltage being applied to zener diode 6. Thus, the zener diode 6 acts as a voltage limiting element for transistor 5. Consequently, even if the positive reference voltage Vp were quite high, for example 100 V, and a voltage exceeding these 100 V had to be applied to line 1 in order to ignite thyristor 3, the voltage drop between the emitter and the collector of transistor 5 would be limited. This allows for a broader range of choice for transistor 5.

Additionally, the capacitor 8 serves to deviate very short voltage pulses applied at line 1, in particular if these voltage pulses are shorter than the gate turn on time of thyristor 3.

Figure 2:
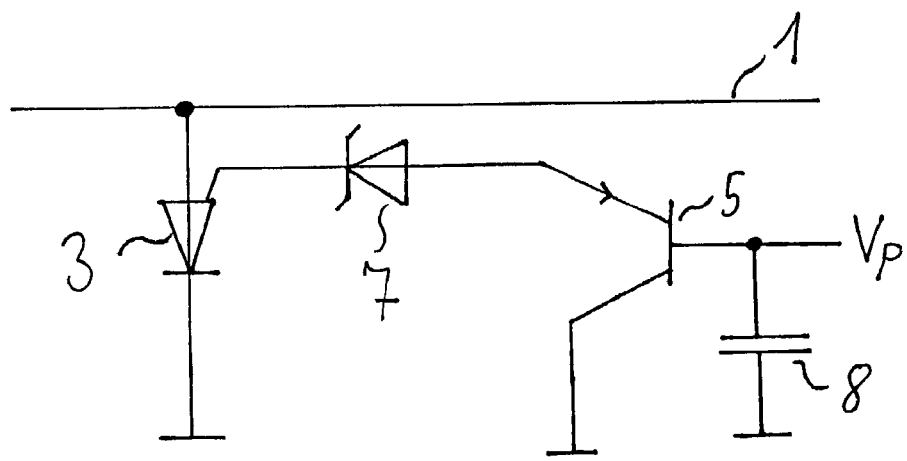
FIG. 2 shows a second embodiment of a voltage protection circuit according to the present invention.

FIG. 2 shows a second embodiment of a voltage protection circuit according to the present invention.

The general design of this voltage protection circuit is the same as the design of the voltage protection circuit shown in FIG. 1, and like elements are designated with the same reference numerals. However, in the voltage protection circuit shown in FIG. 2 no zener diode is provided between the collector of transistor 5 and mass. Instead, a zener diode 7 is provided between the anode side gate of thyristor 3 and the emitter of transistor 5. When a voltage exceeding the positive reference voltage Vp only by a small amount is applied to line 1, no control current flows as a part of this voltage drops over the zener diode 7, and thus the voltage applied at the emitter of transistor 5 is not sufficient so that a current may flow via transistor 5 to mass. Thus, thyristor 3 does not ignite in this case. The magnitude of the small amount of voltage by which the voltage applied to line 1 may exceed the positive reference voltage Vp without thyristor 3 igniting depends on the specifications of zener diode 7 and may be adapted according to the respective application.

In this case, zener diode 7 serves as a voltage limiting element limiting the voltage at the emitter of transistor 5. The circuit shown in FIG. 2 is especially suitable in cases where more than one signal is transmitted via line 1. This is, for example, the case in communication systems where both a telephone signal like a POTS signal (Plain Old Telephone System) and a data signal like an ADSL signal (Asymmetric Digital Subscriber Line) are transmitted. In this case, the sum of the voltage of the telephone signal and the voltage of the data signal may exceed a positive battery voltage used as positive reference voltage Vp. Without the zener diode 7, the thyristor would ignite and thus limit the signal applied at line 1. Through the use of zener diode 7, the voltage necessary to ignite the thyristor 3 is increased, and thus the combined signals transmitted on line 1 are not limited by the voltage protection circuit.

Figure 3:
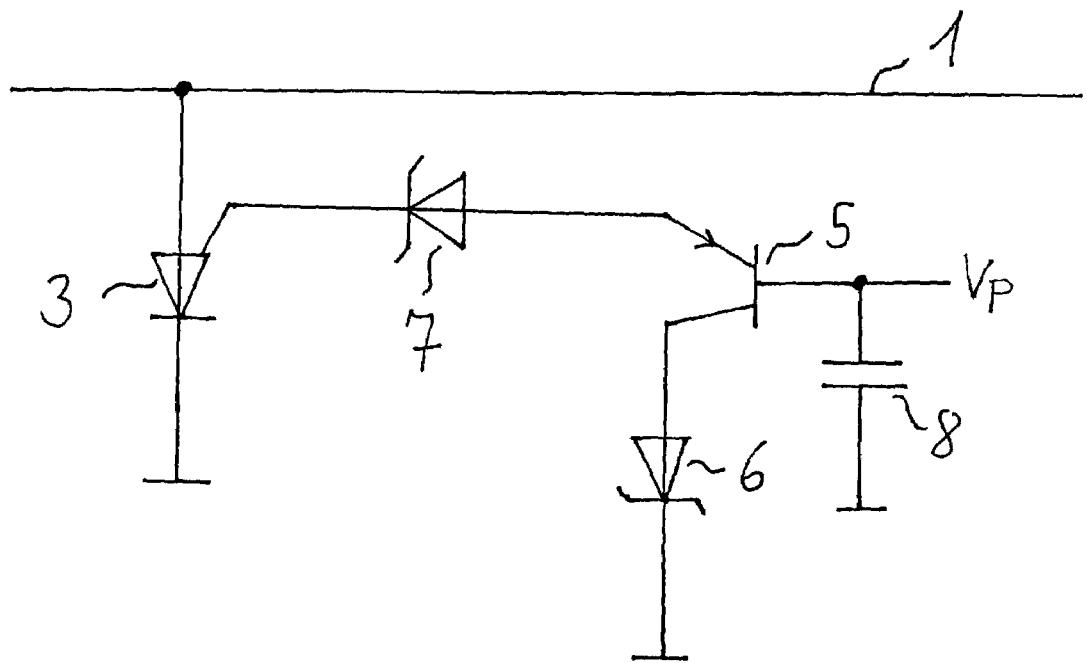
FIG. 3 shows a third embodiment of a voltage protection circuit according to the present invention combining features of the first and second embodiments.
Figure 4:
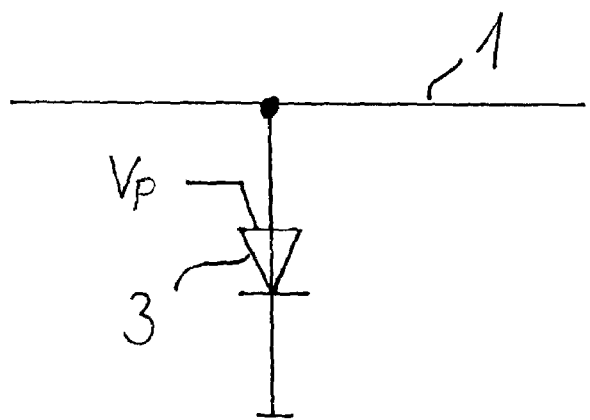
FIG. 4 shows an example for a voltage protection circuit according to the prior art.
Figure 5:
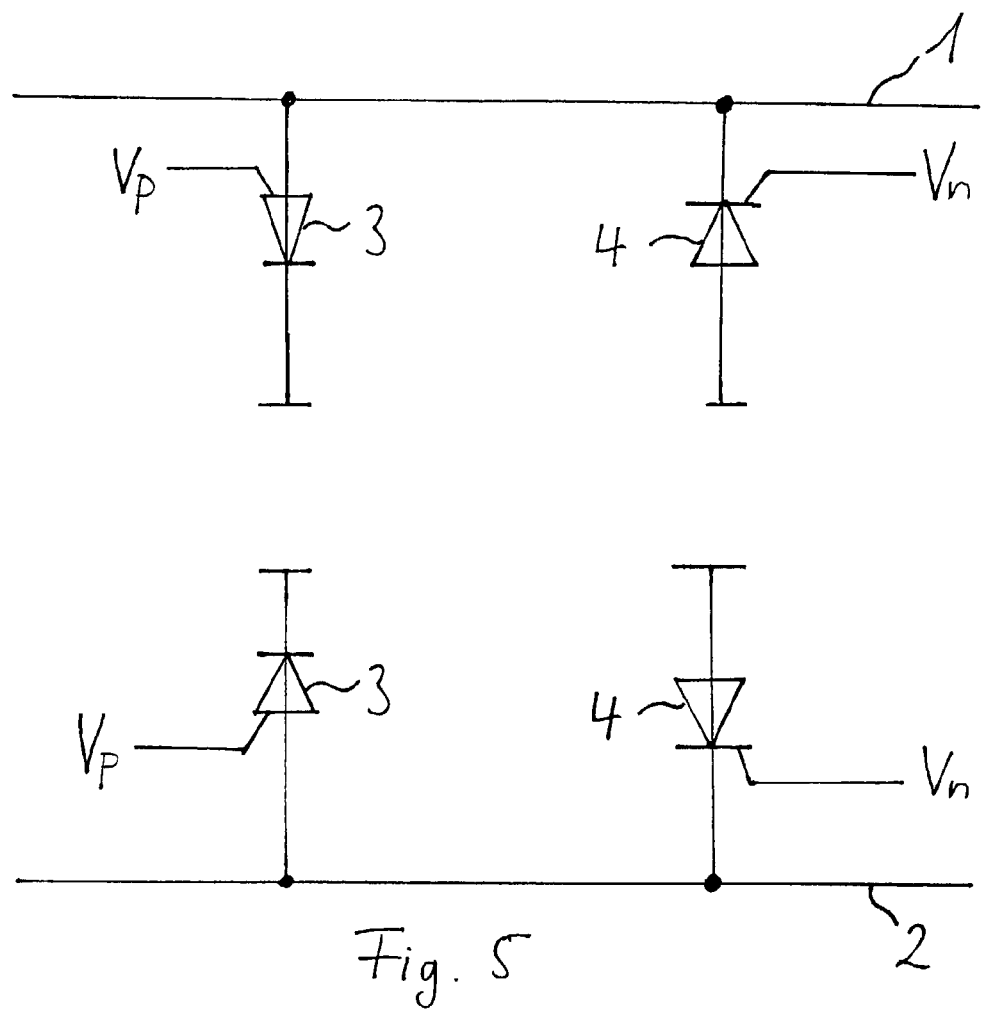
FIG. 5 illustrates the use of a voltage protection circuit like the one in FIG. 4 for protecting two lines.
Figure 6:
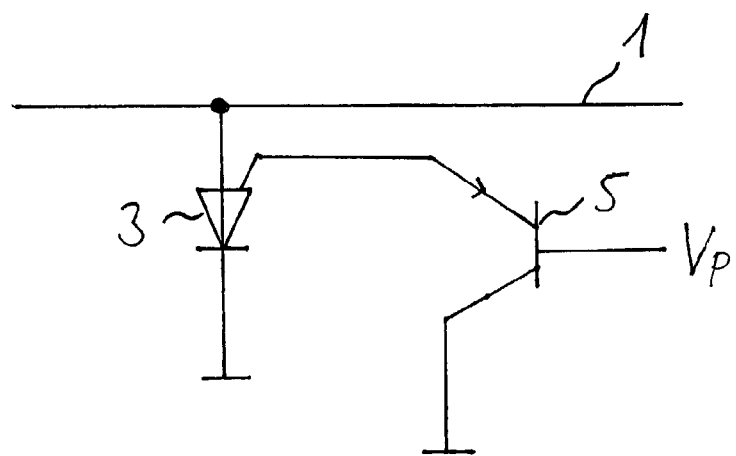
FIG. 6 illustrates the use of a transistor as a reference voltage element.

A third embodiment of a voltage protection circuit according to the present invention is shown in FIG. 3. This voltage protection circuit combines the features of the voltage protection circuits shown in FIGS. 1 and 2. In this case, a first zener diode 6 is provided between the collector of transistor 5 and mass, and a second zener diode 7 is provided between the anode side gate of thyristor 3 and the emitter of transistor 5. The function of the respective zener diodes are the same as described above with reference to FIGS. 1 and 2. Consequently, the voltage protection circuit of FIG. 3 is suitable for the protection of lines where more than one signal is transmitted, and the voltage drop between collector and emitter of transistor 5 is limited, enabling a broader range of choice of possible transistors.

The above embodiments are presented by way of example only. Several modifications of the above voltage protection circuits are possible. In particular, the above embodiments have been described with n-controlled thyristors and a positive reference voltage Vp for protecting a line 1 against a positive overvoltage. A corresponding circuit with a p-controlled thyristor and a negative reference voltage for protecting line 1 against negative overvoltage is also possible. The two possibilities may be combined to protect a line against both positive and negative overvoltage.

It should be noted that the terms "positive reference voltage $V_p$" and "negative reference voltage $V_n$" are intended to generally mean a reference voltage $V_p$ which is more positive than reference voltage $V_n$.

Furthermore, protection elements other than thyristors may be used, for example power field effect transistors. Likewise, voltage limiting elements other than zener diodes, for example other kinds of suitable diodes, may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A voltage protection circuit for a terminal of an electronic device, comprising:
   a protection element, a first terminal of which is coupled to the terminal of the electronic device, a second terminal of which is coupled to a ground potential and a control terminal of which is coupled to a reference voltage element, the protection element having a low resistance between its first and second terminals when the control terminal is in a first state and a high resistance between its first and second terminals when the control terminal is in a second state;
   the reference voltage element being further coupled to a reference voltage and being adapted such that the state of the control terminal depends on a voltage applied at the first terminal of the protection element and the reference voltage; and
   a voltage limiting element coupled to the reference voltage element and the ground potential for limiting a voltage drop over the reference voltage element.

2. The voltage protection circuit according to claim 1, wherein the control terminal of the protection element is in the first state if an absolute value of the voltage applied at the first terminal of the protection element is greater than an absolute value of the reference voltage, and in the second state if the absolute value of the voltage applied at the first terminal of the protection element is less than the absolute value of the reference voltage.

3. The voltage protection circuit according to claim 1, wherein the control terminal of the protection element is in the first state when the sign of the voltage applied at the first terminal of the protection element is the same as the sign of the reference voltage and the absolute value of the voltage applied at the first terminal of the protection element is greater than the absolute value of the reference voltage, while the control terminal of the protection element is in the second state otherwise.

4. The voltage protection circuit according to claim 1, wherein the protection element is a thyristor.

5. The voltage protection circuit according to claim 1, wherein the reference voltage element is a transistor.

6. The voltage protection circuit according to claim 1, wherein the voltage limiting element is a zener diode.

7. The voltage protection circuit according to claim 1, wherein the reference voltage is a battery voltage.

8. The voltage protection circuit according to claim 1, further comprising a further voltage limiting element coupled between the protection element and the reference voltage element, the further voltage limiting element being adapted so that a minimum value of the voltage applied at the first terminal of the protection element necessary for the control terminal to be in the first state is greater than without the further voltage limiting element.

9. The voltage protection circuit according to claim 8, wherein the further voltage limiting element is a zener diode.

10. The voltage protection circuit according to claim 1, further comprising a capacitor coupled between the reference voltage and the ground potential.

11. A protection circuit arrangement for a terminal of an electronic device, comprising:
    a first protection circuit according to claim 1 with the first terminal of its protection element coupled to said terminal of the electronic device having a first reference voltage as its reference voltage; and
    a second protection circuit according to claim 1 with the first terminal of its protection element coupled to said terminal of the electronic device having a second reference voltage as its reference voltage which is different from the first reference voltage.

12. The protection circuit arrangement according to claim 11, wherein the first reference voltage is positive and the second reference voltage is negative.

13. A voltage protection circuit for a terminal of an electronic device, comprising:
- a protection element, a first terminal of which is coupled to the terminal of the electronic device, a second terminal of which is coupled to a ground potential and a control terminal of which is coupled to a reference voltage element, the protection element having a low resistance between its first and second terminals when the control terminal is in a first state and a high resistance between its first and second terminals when the control terminal is in a second state;
- the reference voltage element being further coupled to a reference voltage and being adapted such that the state of the control terminal depends on a voltage applied at the first terminal of the protection element and the reference voltage; and
- a voltage limiting element coupled between the control terminal of the protection element and the reference voltage element, the voltage limiting element being adapted such that a minimum value of the voltage applied at the first terminal of the protection element necessary for the control terminal of the protection element to be in the first state is greater than without the voltage limiting element.

14. The voltage protection circuit according to claim 13, wherein the voltage limiting element is a zener diode.

15. The voltage protection circuit according to claim 13, further comprising a capacitor coupled between the reference voltage and the ground potential.

16. The voltage protection circuit according to claim 13, wherein the control terminal of the protection element is in the first state when the sign of the voltage applied at the first terminal of the protection element is the same as the sign of the reference voltage and an absolute value of the voltage applied at the first terminal of the protection element is greater than an absolute value of the reference voltage, while the control terminal of the protection element is in the second state otherwise.

17. The voltage protection circuit according to claim 13, wherein the protection element is a thyristor.

18. The voltage protection circuit according to claim 13, wherein the reference voltage element is a transistor.

* * * * *